G. F. MEYER.
Apparatus for Cooling Air.
No. 211,417. Patented Jan. 14, 1879.
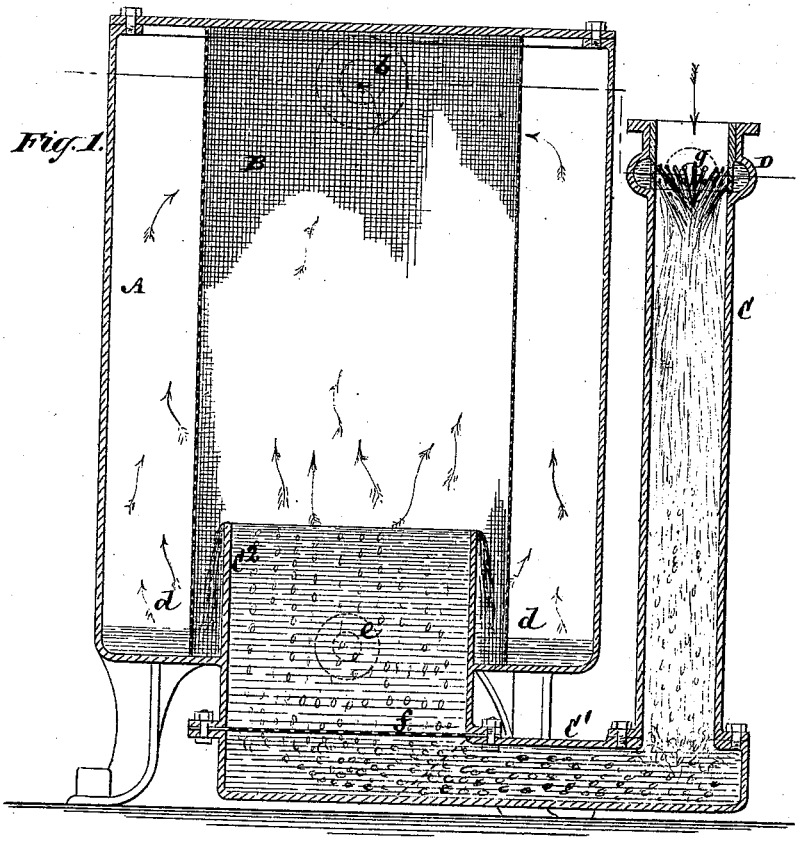
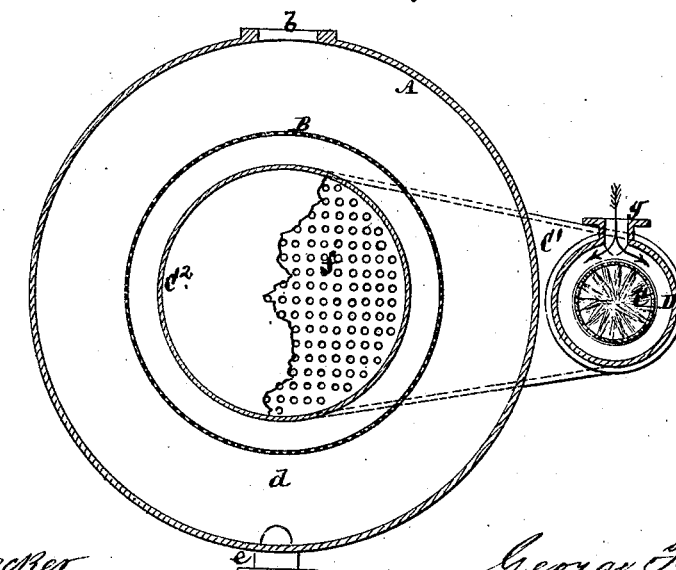

UNITED STATES PATENT OFFICE.

GEORGE F. MEYER, OF NEW YORK, N. Y., ASSIGNOR OF ONE-HALF HIS RIGHT TO CORNELIUS H. DELAMATER AND GEORGE H. ROBINSON, OF SAME PLACE.

IMPROVEMENT IN APPARATUS FOR COOLING AIR.

Specification forming part of Letters Patent No. 211,417, dated January 14, 1879; application filed June 8, 1878.

*To all whom it may concern:*

Be it known that I, GEORGE F. MEYER, of the city, county, and State of New York, have invented certain new and useful Improvements in Apparatus for Cooling Air and other Aeriform Fluids, of which the following is a full, clear, and exact description, reference being had to the accompanying drawings, forming part of this specification.

This invention relates to apparatus for cooling air or gas by means of water or other cooling liquid or solution, and is more especially intended for cooling air for circulation through meat-safes or meat-preserving chambers on board ships or elsewhere.

The objects of the invention are to effect, as nearly as possible, a perfect interchange of temperature between the air or gas to be cooled and the liquid employed for cooling the same by establishing a very thorough distribution of the cooling-liquid through the air or gas to be cooled and of the air or gas through the cooling-liquid, and thereby effecting the cooling by the use of a very small quantity of the cooling-liquid, and also to effect a quick and perfect separation of the cooling-liquid and the air or gas after the cooling of the latter.

This invention consists in the combination, with an upright pipe, down within which the refrigerating or cooling liquid is sprayed from a suitable spray-distributer among the air or gas to be cooled, of an overflow-pipe in communication with said upright pipe, and an exterior chamber inclosing said overflow-pipe, and forming outside of the latter pipe a well, into which the overflowing cooling-liquid is received, while the cooled air or gas escaping from the said liquid rises upward into the said chamber, whence it is to be taken for use in the cooling-room or other place in which it is to be used.

The invention also consists in the combination, with said pipes and spray-distributer, of a perforated or reticulated diaphragm arranged at the bottom of said overflow-pipe, for the purpose of causing a greater diffusion of the air or gas to be cooled among the air or gas passing upward through the latter pipe.

It also consists in the combination, with the said exterior chamber, overflow-pipe, and well, of an upright screen, within the lower part of which the upper part of the said overflow-pipe is situated, and by which the final separation of the liquid from the air or gas is effected.

It consists, finally, in the combination of all the elements hereinabove specified, in the manner hereinafter set forth.

Before proceeding to describe my improvements in detail, I will state that in carrying out my invention various non-congealing liquids or solutions may be used for cooling, and said liquids or solutions may be cooled artificially before use, and also afterward for repeated use, by apparatus such as is used for making ice, or by any other suitable means.

Figure 1 in the drawings is a vertical section of an apparatus containing my improvements. Fig. 2 is a horizontal section of the same.

A is a closed vessel, of upright, cylindrical, or other form, in which is an upright screen, B, of wire-gauze or other perforated or reticulated material of corresponding form, which constitutes an inner chamber within the said vessel A.

C is an upright pipe, of any suitable height, which is to be connected at its upper end with a compression-pump or other air or gas compressor for the introduction to the apparatus, at a suitable pressure, of the air or gas to be cooled. This pipe is connected by a duct, $C^1$, at its bottom with the bottom of an upright pipe, $C^2$, which enters the bottom of the vessel A, and projects upward some distance within the chamber B, so that a well, $d$, is formed around the said pipe $C^2$ within the said vessel A and chamber B. Across the bottom or lower part of the pipe $C^2$, and above the top of the duct $C^1$, there is a perforated or reticulated plate or diaphragm, $f$.

Around the upper part of the pipe C is an annular chamber or distributer, D, which receives the cooling-liquid through a pipe, $g$, and which communicates with the interior of said pipe C by means of numerous perforations for the introduction of the said liquid in a fine spray or shower into said pipe. This chamber D may have substituted for it a rose or perforated distributer arranged within the pipe C.

At or near the bottom of the vessel A is an outlet-opening, $e$, for the escape of the cooling-liquid after use. This may be connected with a pump for returning the cooling-liquid to a refrigerator or other cooling apparatus for repeated use. At or near the top of the said vessel A there is an outlet-opening, $b$, for the escape of the cooled air or gas to the place in which it is to be used for cooling purposes.

The operation of the apparatus is as follows: The air or gas to be cooled is forced down the pipe C at a pressure greater than that of the static pressure of the column of liquid in the pipe $C^2$, while the cooling-liquid introduced through the distributer D falls through the said pipe C in a shower. The liquid falling to the bottom of the pipe C is displaced by the pressure of the air or gas in the said pipe, and caused to pass through the duct $C^1$ into the pipe $C^2$ and overflow from the said pipe into the well $d$, while the air passes along the upper part of the duct $C^1$ to the diaphragm $f$, through which it passes in a finely-divided state, afterward bubbling up through the liquid in the pipe $C^2$ and escaping from the surface of the liquid at the top of said pipe and into the screen or reticulated chamber B, through the sides of which it escapes into the surrounding outer portion of the vessel A, whence it passes or is drawn off through the outlet $b$, while the liquid passes or is drawn off from the well $d$ through the outlet $e$.

The effect of the above-described operation is that the liquid falling in a shower in the pipe C is distributed in a finely-divided state among the air or gas in the said pipe, and thereby caused to abstract from the said air or gas a portion of its heat, and the air or gas afterward bubbling up and being distributed in a finely-divided state through the cooling-liquid in the pipe $C^2$ gives up the remaining excess of heat, or a large proportion thereof, to the said liquid. Any air or gas contained in the liquid which overflows the pipe $C^2$ into the well $d$ is quickly separated from the said liquid by the difference of specific gravity, and the final separation from the air or gas which rises from the pipe $C^2$ of any liquid carried up by the said air is effected by the passage of the latter through the screen B, the liquid so separated running down the screen into the well $d$.

It must be observed that, in the employment of this apparatus for cooling gases, the cooling-liquids employed should be such as have no affinity for the gases to be cooled.

I claim—

1. The combination of an upright air-pipe, down within which the refrigerating or cooling liquid is sprayed, and the air or gas to be cooled is simultaneously passed under pressure in direct contact with the refrigerating-liquid within said pipe, an upper spraying-distributer of said liquid applied to said pipe, an overflow-pipe in communication below with said upright pipe, and a chamber inclosing the overflow-pipe and constructed to form a well outside of the latter, substantially as specified.

2. The combination, with the overflow-pipe $C^2$, of the perforated or reticulated diaphragm $f$, the upright air-pipe C, connected below with said overflow-pipe, and a spraying-distributer of cooling-liquid applied to the air-pipe above the level of the overflow-pipe, essentially as described.

3. The combination, with the outer chamber, A, and interior screen, B, of the overflow-pipe $C^2$, arranged within the lower end of said screen, and constructed to form a well, $d$, outside of said overflow-pipe and in the lower end of the outer chamber, essentially as and for the purposes herein set forth.

4. The combination of the spraying-distributer D, the air-pipe C, the hollow base or connection $C^1$, the overflow-pipe $C^2$, the chamber A, which receives the cooled air and cooling-liquid, and the screen B, substantially as shown and described.

GEO. F. MEYER.

Witnesses:
T. J. KEANE,
HENRY T. BROWN.